Jan. 30, 1968   E. H. BELK   3,366,417
HEADREST ASSEMBLY FOR VEHICLE SEAT BACK
Filed Aug. 8, 1966   2 Sheets-Sheet 1
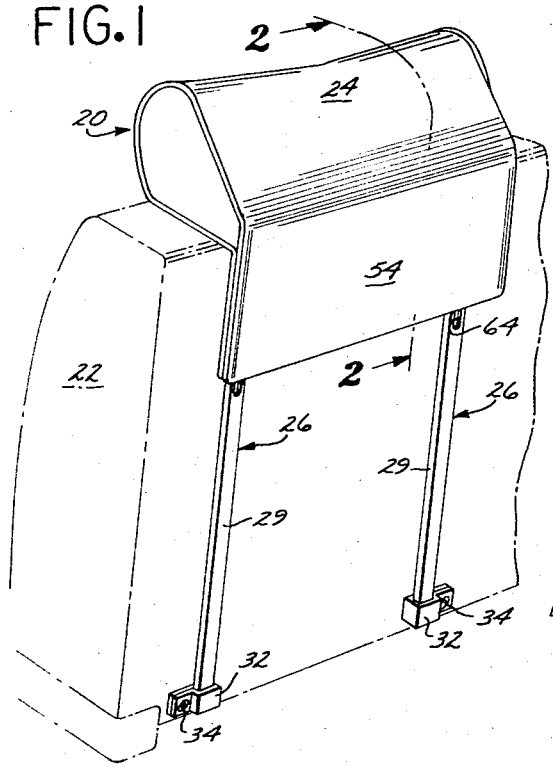
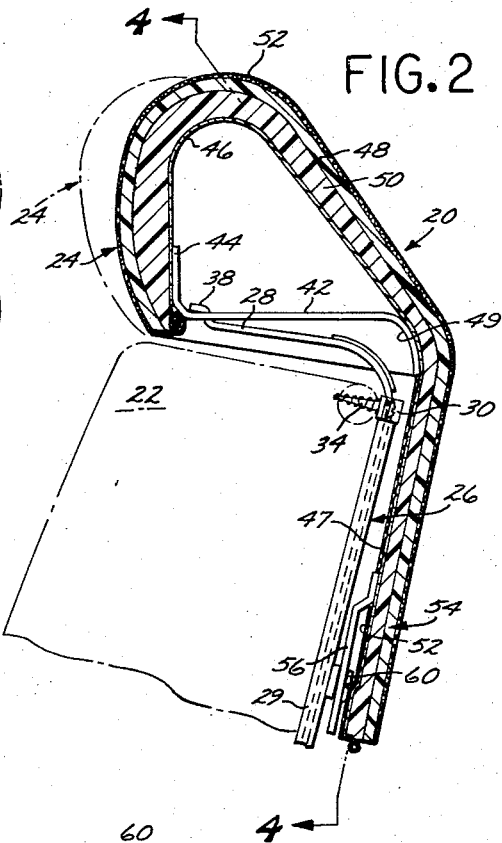
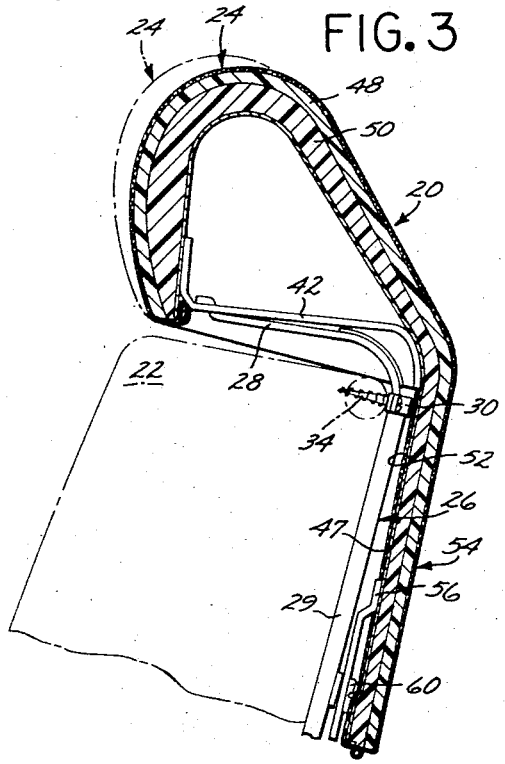
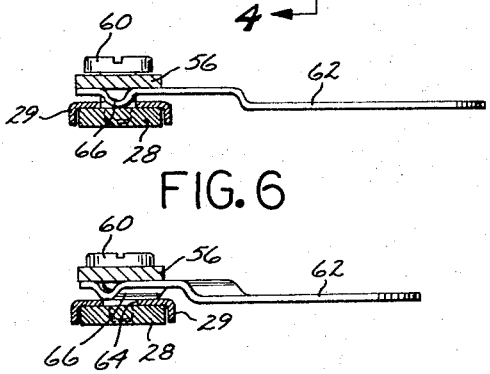
INVENTOR.
EARL H. BELK
BY Fulwider, Patton, Rieber,
Lee and Utecht
ATTORNEYS Jan. 30, 1968  E. H. BELK  3,366,417
HEADREST ASSEMBLY FOR VEHICLE SEAT BACK
Filed Aug. 8, 1966  2 Sheets-Sheet 2
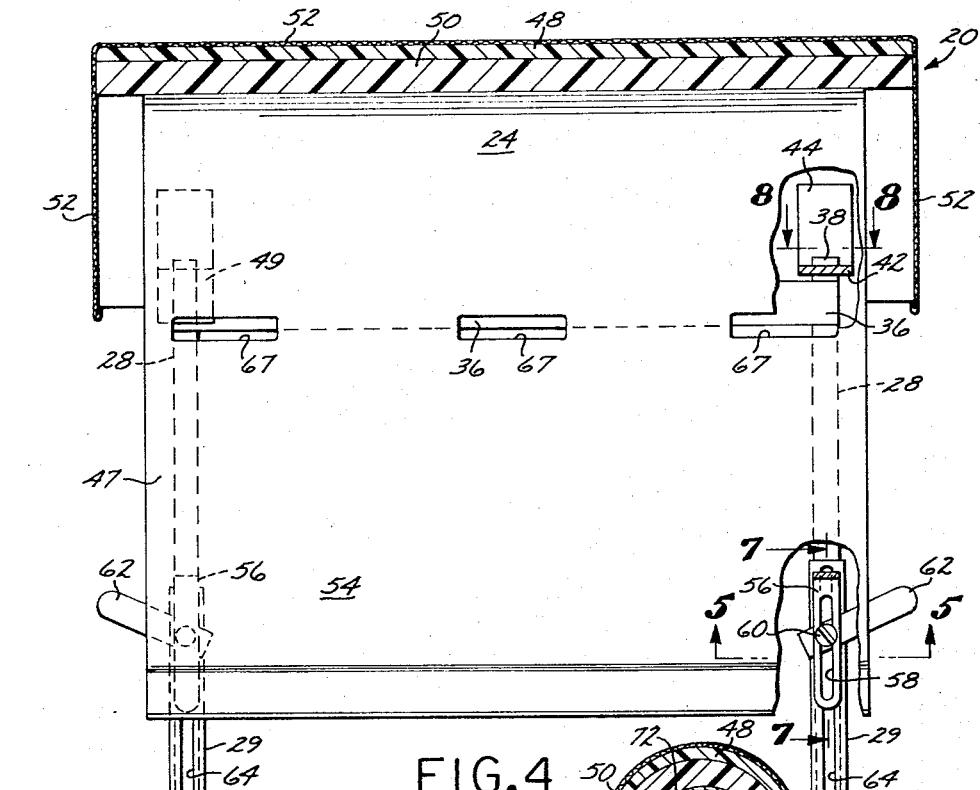
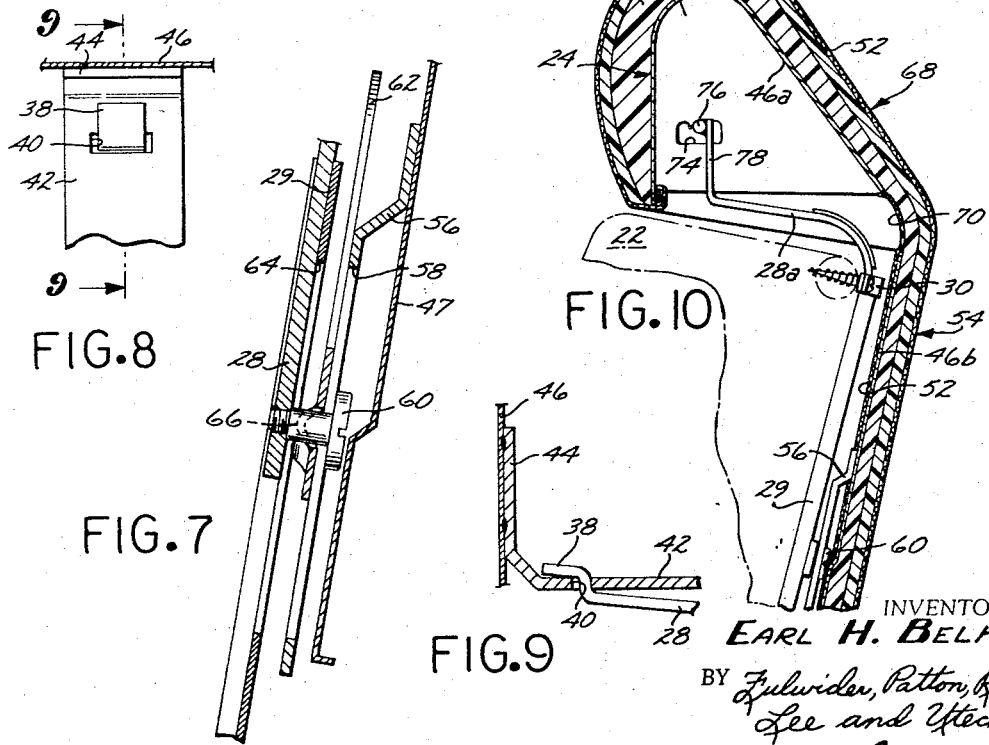
INVENTOR.
EARL H. BELK
BY Fulwider, Patton, Rieber,
Lee and Utecht
ATTORNEYS United States Patent Office 3,366,417
Patented Jan. 30, 1968

3,366,417
HEADREST ASSEMBLY FOR VEHICLE
SEAT BACK
Earl H. Belk, 931 Long Beach Blvd.,
Long Beach, Calif. 90813
Filed Aug. 8, 1966, Ser. No. 570,864
7 Claims. (Cl. 297—397)

ABSTRACT OF THE DISCLOSURE

A headrest assembly for a vehicle seat back, and including sheet material energy absorption sections for protecting not only the occupant of the seat back but also the vehicle passenger behind the seat back.

---

The present invention relates to a headrest assembly for a vehicle seat back, and more particularly to a headrest mountable adjacent the upper extremity of a vehicle seat back to cushion the neck-head area of the seat occupant, and which includes cushioning means to protect rear seat passengers from injury upon the seat back or the support structure for the headrest.

The forces developed upon the neck and head of a vehicle occupant during a rear end collision can be sufficiently great to impart soft tissue injury to the neck and adjoining areas, such injury commonly being referred to as a "whiplash" injury. The forces can be absorbed to a large extent by locating a bolster or head rest immediately behind the neck and head and attaching it to the vehicle seat back. The headrest projects above the seat back and tends to cushion and decelerate the mass of the head during a rear end collision. In this position the headrest is subject to considerable stress and must be securely mounted to the seat back to prevent it from being torn loose.

The support structure for mounting such a headrest to a vehicle seat back in a new automobile, that is, as original equipment, is generally disposed within the interior of the seat back. In this position the head rest support structure cannot be struck by the heads of rear seat passengers pitching forward during a violent stop or the like. However, a great number of headrests are added as supplementary equipment to existing vehicle seat backs.

Typically, the headrests which are mounted to existing seat backs include support portions engaged upon the rear portion of the vehicle seat back for securement to the seat frame. In this position the head rest support structure adjacent the upper rear portion of the seat back is exposed and presents a hazard to rear seat occupants of the vehicle.

Even in those instances in which the headrest support structure is disposed within the seat back, as would be the case with well-designed orignal equipment, the seat back itself is a hazard to rear passengers during an accident. Heretofore, crash pads have been used upon the upper rear portion of the seat back to pad the frame portions of the seat back, but when the headrest is raised somewhat, the headrest support structure projecting above the seat back is exposed and the crash pad on the seat back is of course of no benefit in this regard.

Accordingly, it is an object of the present invention to provide a headrest assembly which can be mounted to a vehicle seat back utilizing support structure engaged upon the exterior of the seat back, but which includes a rearwardly and downwardly-projecting portion constituting padded safety apron or flap to overlie such support structure and thereby protect a rear seat passenger from injuring himself on it.

A further object of the invention is to provide a headrest assembly which can also be mounted to a vehicle seat back utilizing support structure located almost entirely within the interior of the seat back, but which includes the aforementioned padded safety flap to overlie the upper rear portion of the seat back to thereby protect a rear seat passenger from injuring himself on the seat back frame or from injuring himself on the headrest support structure when the headrest is raised.

Another object of the invention is to provide such a headrest assembly in which the padded flap portion of the headrest is movable vertically in such a manner as to effect a fore-and-aft movement of that portion of the headrest which is located forwardly of the padded flap. In this manner the headrest can be better accommodated to the requirements of persons of different height. More particularly, because of the rearward inclination of the usual seat back, a tall person has to hunch his head forwardly after the usual headrest has been adjusted upwardly for his height. With the present headrest assembly, the headrest can be moved in a fore-and-aft direction to project forwardly a greater distance, thus cushioning the head-neck area of the tall person at a point desirably more forwardly located, compared to the conventional headrest. As will be apparent, this fore-and-aft adjustment can also be combined with a height adjustment mechanism as well.

A further object of the invention is the provision of a headrest assembly of the aforementioned character which is relatively inexpensive to manufacture, ruggedly constructed, and adapted for use as "after-market" equipment on vehicles not having headrests as new or original equipment.

Other objects and features of the invention will become apparent from consideration of the following description taken in connection with the accompanying drawings, in which:

FIG. 1 is a perspective view of a headrest assembly according to the present invention, and illustrated in operative position upon a typical vehicle seat back;

FIG. 2 is an enlarged cross sectional view taken along the line 2—2 of FIG. 1, and illustrating the headrest assembly in an intermediate or normal position;

FIG. 3 is a view identical to FIG. 2 except that the headrest assembly is illustrated in its lowest position, such as would be used by a person of short stature;

FIG 4 is an enlarged view taken along the line 4—4 of FIG.2;

FIG. 5 is an enlarged view taken along the line 5—5 of FIG. 4, with the clamping handle in its locked position;

FIG. 6 is a view identical to that of FIG. 5, except that the clamping handle is illustrated in its unlocked position;

FIG. 7 is an enlarged view taken along the line 7—7 of FIG. 4;

FIG. 8 is an enlarged view taken along the line 8—8 of FIG. 4;

FIG. 9 is an enlarged view taken along the line 9—9 of FIG. 8; and

FIG. 10 is a cross sectional view similar to FIG. 2, but illustrating another embodiment of the present invention.

Referring now to the drawings, and particularly to FIGS. 1 through 9, there is illustrated a headrest assembly 20 according to the present invention. The assembly 20 is shown mounted to a generally vertically-oriented seat back 22 of the type commonly used in automobiles. It is particularly noted that the assembly 20 is externally attachable to the seat back 22 so that it is adapted for use upon seat backs 22 which were not originally provided with head rests.

The head rest assembly 20 comprises, generally, a transversely-oriented bolster or headrest 24, located immediately above the upper end of the seat back 22, and a support structure 26 which mounts the headrest 24 and secures it in position upon the seat back 22.

The support structure 26 includes a pair of elongated, transversely spaced-apart support arms 28, each having a substantially vertically-oriented portion or lower extremity which extends down the rear face of the seat back 22. The upper extremity of each arm is substantially horizontally oriented, projecting forwardly above the seat back 22.

The vertical portions of the arms 28 telescopically extend into the hollow central portions of a pair of vertically-extending, channel-shape support columns 29. As will be seen, the vertical position of the head rest 24 can be adjusted by adjusting the vertical positions of the support arms 28 relative to the support columns 29.

The extremities of the support columns 29 adjacent the upper end of the seat back 22 are disposed through a pair of clamps or mounting brackets 30, while the extremities of the columns adjacent the lower end of the seat back 22 are disposed through a similar pair of brackets 32. Both brackets 30 and 32 are suitably secured to the internal frame of the seat back 22 by usual machine screws 34 or the like.

The vertical adjustability of the headrest 24 is similar to that described in my copending patent application Ser. No. 535,827, filed Mar. 21, 1966, and entitled, "Head Rest for Vehicle Seat."

The horizontal portion of each support arm 28 terminates in a short offset end portion 38. As best viewed in FIGS. 2, 8, and 9, the pair of portions 38 extend through complemental openings 40 provided in a pair of parallel sheet metal straps 42 which extend in a generally fore-and-aft direction immediately above the support arms 28. The forward extremity of each strap 42 is formed into an upwardly-extending tab 44 which is welded to the front wall of a curvilinear structurally continuous sheet metal inner liner 46 which extends transversely almost the full width of the headrest 24. The liner 46 is characterized by an inverted U-shape in which the curved rear wall of the liner extends rearwardly and downwardly to define a sheet metal flap 47 located in overlying relation to the upper portion of the rear face of the seat back 22. The rearward extremity of each strap 42 is formed into a downwardly-extending rear tab 49 which is welded to the rear wall of the inner liner 46.

The sheet metal inner liner 46 constitutes an incompressible, progressively deformable sheet material structure for absorbing impact forces. The front wall constitutes an energy absorption section for the head of the occupant of the seat back, and the curved rear wall is a similar absorption section for a rear seat passenger. It is overlaid or exteriorly covered by a layer 48 of molded or otherwise shaped polyurethane foam material of one density, and another layer 50 of similar material, but of a higher density. This provides progressive absorption of impact forces, as is well known.

A cover 52 made of plastic material or the like contains and overlies the foam material 48 and 50 to hold it in place. It is fabricated in any suitable fashion, as by cutting sections to the proper shape and assembling them with usual welting. The foam material 48 and 50 preferably extends laterally of the inner liner 46 to receive end pads (not shown) for covering and closing the open ends of the head rest.

It is also noted that the foam materials 48 and 50, as well as the cover 52, extend downwardly and are coextensive with the depending liner flap 47 to thereby define a padded safety flap 54 extending downwardly in overlying relation to the brackets 30 and the adjacent portions of the support arms 28 and the support columns 29 at the upper rear portion of the seat back 22. This overlying relation of the padded flap 54 protects rear seat passengers from injuring themselves on the head rest support structure. For example, the usual lap seat belt causes a rear seat passenger to pitch forward when the vehicle comes to an abrupt stop. This throws the passenger forwardly and downwardly against the upper rear portion of the front seat back 22, and could seriously injure the passenger if no padded flap 54 were provided.

A pair of transversely-spaced, generally vertically-oriented clamping elements 56 are welded to the inner face of the sheet metal flap 47 and, as best viewed in FIGS. 4 through 7, each of the elements 20 includes a vertically-oriented slot 58 which vertically slidably receives the threaded shank of a clamping screw 60.

Each clamping screw 60 extends through the slot 58 of its associated clamping element 56, through a suitable opening provided in a generally laterally-extending clamping handle 62, through a vertically-elongated slot 64 in the associated support column 29, and then into a threaded opening in the lower extremity of the associated support arm 28.

As best viewed in FIG. 5, each handle 62 is characterized by a locking cam ridge 66 which rests within the slot 64 of the channel-shape support column 29 in the unlocked position of the clamping handle 62. The handle 62 is moved either up or down with respect to the horizontal to move the ridge 66 out of the slot 64 and thereby bring together and lock the padded flap 54 and the support column 29, and the support arm 28 and the associated support column 29. The handle 62 is illustrated in an upwardly-pivoted locked position in FIG. 4.

With this arrangement, the vertical position of the headrest is quickly accomplished by loosening or upwardly moving the handles 62 to their unlocked positions and then grasping and upwardly moving the headrest 24 to slidably move the lower extremities of the support arms 28 within the support columns 29.

The head rest 24 can also be adjusted in a fore-and-aft direction by pushing or pulling upon it. Thus, with handles 62 in their unlocked positions, the front of the headrest 24 can be urged rearwardly with the heel of the hand to pivot the headrest straps upon the support arm end portions 38. This rearward pivotal movement moves the head rest 24 from the phantom line to the full line position illustrated in FIG 2 and also has the effect of moving the padded flap 54 downwardly. This latter action occurs by reason of vertical sliding movement of the flap elements 56 relative to the clamping screws 60. This combination of pivotal and vertical movements is facilitated by providing three transversely-arranged slots 67 in the inner liner 46, as best illustrated in FIG. 4, which structurally weakens the liner and permits easier bending thereof along a transverse axis or hinge joint.

Once the vertical and fore-and-aft positions of the head rest 24 are adjusted, the clamping handles 62 are then moved to non-horizontal or angularly-oriented locking positions, as best viewed in FIG. 4.

The position of the head rest 24 for a person of normal stature is illustrated in full line in FIG. 2 and in phantom outline in FIG. 3. The position of the head rest for a tall person is indicated in phantom outline in FIG. 2, and for a short person is indicated in full line in FIG. 3.

Referring now to FIG. 10, there is illustrated a second form of head rest assembly, designated generally by the numeral 68 and substantially identical to the head rest assembly 20. The points of difference between the assemblies are the construction of the transverse hinge joint between the upper and lower portions of the head rest, and the construction of the pivotal interconnection between the head rest and the support structure for the head rest.

More particularly, the inner liner is identical to the liner 46 but is made in two pieces, being discontinuous along the transverse hinge joint between the upper and lower portions of the head rest. The inner liner is constituted by a curvilinear section 46a of inverted U-shape, and by a depending liner section 46b located below and spaced from the lower edge of the section 46a.

A flap 70 made of plastic or like material is secured to and connects the adjacent transverse edges of the liner sections 46a and 46b, affording a flexible joint for pivotal action between these sections, as will be seen.

A pair of end plates or arm brackets 72 are suitably secured at the opposite ends of the inner liner 46a within the hollow interior of the head rest. Each of the brackets includes an opening 74 characterized by an upper margin having three adjacent arcuate seats which open downwardly to receive a short transverse arm 66 made of a short section of round stock. The pair of arms 76 are each welded to an upwardly-extending portion of 78 of a respective one of the support arms 28a.

By grasping the head rest 24, moving it upwardly, and then tipping it in a fore-and-aft direction, it is possible to locate the transverse arms 76 in a selected pair of the seats of the openings 74 to thereby adjust the fore-and-aft position of the headrest 24 to suit the user. The weight of the headrest 24 is sufficient to firmly seat the transverse arms 76, and it has been found that the headrest maintains this selected position under relatively high acceleration and deceleration forces. A number of fore-and-aft adjustment structures of a similar nature are also described in my copending patent application Ser. No. 535,827, filed Mar. 21, 1966, and entitled, "Head Rest for Vehicle Seat."

Operation or use of the headrest assembly 68 is substantially identical to that of the assembly 20. More particularly, the vertical height of the headrest assembly 68 is established in exactly the same way as described in connection with the assembly 20. Once the vertical height is selected, the fore-and-aft adjustment is provided by grasping and raising the upper portion of the headrest sufficiently to seat the arms 76 in the desired pair of the seats of the openings 74. The consequent movement of the upper portion of the headrest is accommodated by the flexible connecting flap 70.

From the foregoing, it will be apparent that a headrest assembly has been provided which is adapted to not only cushion the head-neck area of the headrest user, but also to overlie and cushion the support structure of the headrest so that a rear seat passenger will not be injured if he is accidentally pitched forward onto the headrest assembly.

The headrest assemblies described are particularly adapted for attachment to already-manufactured seat backs, each being characterized by the previously-described padded flap for covering the exteriorly-located supporting structure usually associated with later-mounted headrests.

However, where the support structure is mounted interiorly of the seat back and attached to the seat frame, as is common with headrest assemblies installed on new vehicles as "original equipment," it will be obvious that the padded flap 54 moves up and down with the head rest 24. A rear seat passenger is thus protected from injuring himself on the headrest support structure in all of the vertically-adjusted positions of the headrest and is also protected from injuring himself on the front seat back frame where it is covered by the flap 54.

Various modifications and changes may be made with regard to the foregoing detailed description without departing from the spirit of the invention or the scope of the following claims.

I claim:
1. A headrest assembly for a vehicle seat back, said assembly comprising:
   support means for mounting upon a vehicle seat back; and
   a transversely-oriented headrest carried by said support means and including a structurally continuous sheet of incompressible, progressively deformable material of generally inverted U-shape, having an overlying exterior padding, and extending across the width of said head rest, said sheet having a forward wall for location above the upper end of the seat back and constituting an energy absorption section for the head of the occupant of the seat back, said sheet further having a rearward wall spaced rearwardly of said forward wall and extending downwardly for location in overlying spaced relation to the upper rear portion of the seat back and constituting an energy absorption section for the head of a vehicle passenger located behind the seat back.

2. A headrest assembly according to claim 1 wherein said support means includes support portions adapted to engage upon the exterior upper rear portion of the vehicle seat for securement thereto, and said rearward wall of said sheet is sufficiently long to overlie said support portions at said upper rear portion of the seat back to thereby protect rear seat passengers of the vehicle from injuring themselves on said support portions.

3. A headrest assembly according to claim 2 wherein said support means includes a pair of elongated, vertically-oriented supported arms pivotally mounted at their upper extremities to said head rest forwardly of said rearward wall of said sheet;
   a pair of elements secured to said rearward wall; and
   clamp means operative to clamp said pair of elements in one of various vertical positions relative to said support arms whereby movement of said rearward wall upwardly and downwardly effects corresponding pivotal movement forwardly and rearwardly of said forward wall.

4. A headrest assembly according to claim 3 wherein the material of said rearward wall is structurally weakened along a transverse axis to facilitate said pivotal movement.

5. A headrest assembly according to claim 3 wherein the pivotal mounting of the upper extremities of said support arms to said headrest includes means affording relative shifting therebetween in a fore-and-aft direction for adjusting the fore-and-aft position of said forward wall.

6. A headrest assembly according to claim 3 wherein said support arms are vertically slidably carried by a pair of support columns adapted for securement to the seat back, and said clamp means is also operative to clamp together said support arms and said support columns to thereby fix said headrest in a vertically-adjusted position.

7. In combination: a vehicle seat back including a horizontally and transversely extending frame member at the top of said seat back; support means for mounting upon said vehicle seat back; and a transversely-oriented headrest carried by said suppot means and including a structurally continuous sheet of incompressible, progressively deformable material of generally inverted U-shaped, having an overlying exterior padding, and extending across the width of said headrest, said sheet having a forward wall located above the upper end of said seat back and constituting an energy absorption section for the head of the occupant of said seat back, said sheet further having a rearward wall spaced rearwardly of said forward wall and extending downwardly in overlying, spaced relation to said frame member and constituting an energy absorption section for the head of a vehicle passenger located behind said seat back.

References Cited

UNITED STATES PATENTS

| | | | |
|---|---|---|---|
| 2,867,266 | 1/1959 | Vogler | 297—397 X |
| 3,254,918 | 6/1966 | Barker | 297—397 |
| 3,292,973 | 12/1966 | Cogut | 297—397 |
| 3,304,120 | 2/1967 | Cramer | 297—403 |

FOREIGN PATENTS 893,519   4/1962   Great Britain.

CASMIR A. NUNBERG, *Primary Examiner.*